Patented June 19, 1923.

1,459,036

UNITED STATES PATENT OFFICE.

OTTO F. REINHOLD, OF MAPLEWOOD, NEW JERSEY.

DEODORIZING MATERIAL.

No Drawing.   Application filed January 11, 1922. Serial No. 528,456.

*To all whom it may concern:*

Be it known that I, OTTO F. REINHOLD, a citizen of the German Republic, residing at Maplewood, in the county of Essex and State of New Jersey, have invented certain new and useful Improvements in Deodorizing Materials, of which the following is a specification.

This invention relates to a deodorizing material and more particularly to a deodorizing composition suitable for use in toilets, bath rooms, washrooms, railway cars, and other places where bad or noxious odors may result from poor ventilation or unsanitary conditions.

To secure the desired deodorizing effect in the conditions of this kind a deodorant must be provided which is slowly volatile so that as it vaporizes or sublimes it provides sufficient vapor to give the desired deodorizing effect without a too rapid volatilization and wasting of the material. The deodorant must, itself, have a pleasant or a nonirritating odor. The materials having these qualifications are limited and are in general higher in price than is desired for the uses stated above.

An object of the present invention is to provide a cheap and effective deodorizing material.

Another object of the invention is to provide a deodorizing material suitable for deodorizing toilets, bath rooms, wash rooms, railway cars and similar places.

As the base or active ingredient of the deodorant, I employ a mixture of chlorinated or partly chlorinated products of benzol or other suitable aromatic hydrocarbons from which the mono- and pdi-chlor derivatives have been largely or entirely removed. This product may be produced by chlorinating benzol directly with chlorine in the usual manner, with the addition of nitrobenzol or other commonly used agents for controlling the reaction. A mixture of chlorinated products results which contains the monochlor substitution products and ortho and para substitution products and a small amount of meta dichlor benzol. The monochlor benzol is removed from the resulting mixture by distillation in a vacuum and the p dichlor benzol is thereafter removed by chilling or freezing and separation of the resulting crystals of p dichlor benzol from the mother liquor by filtration, settling or centrifing.

The resulting mother liquor forms the base or active ingredient of my deodorant and disinfectant. It is a volatile liquid having a nonirritating odor which covers or overcomes and kills disagreeable or noxious odors. Its composition may vary to some extent but in general it comprises the o and m dichlor benzol, traces of mono-chlor-benzol and p dichlor-benzol and varying amounts of unconverted benzol and other inert materials.

When a liquid deodorant is desired the above described product may be used directly. When, however, a solid product is desired, as is usually the case, the above liquid is mixed with a volatile solid such as naphthaline or a suitable camphor to form a solid or semi-solid product which may be molded into a suitable form. The product may be blended in either the solid or liquid form with volatile essential oils or perfumes to provide a desired odor or to increase the deodorizing power of the product.

The deodorizing material may be used in the liquid form as a wash or in the liquid or solid form may be deposited in suitable receptacles, perforated to permit the volatilization of the material. When thus used the composition slowly evaporates without leaving a material residue.

Having described the invention, what I claim and desire to secure by Letters Patent is:

1. A deodorizing composition which comprises, a mixture of ortho dichlor benzol and a volatile solidifying agent in amount sufficient to form a substantially solid deodorizing block.

2. A deodorizing composition which comprises a mixture of ortho dichlor benzol and naphthaline in amount sufficient to form a substantially solid deodorizing block.

3. A deodorizing composition which comprises a mixture of the chlorination products of benzol with the exception of substantial amounts of mono-chlor-benzol and the para-dichlor-benzol and in which the ortho-dichlor-benzol predominates, and a volatile solidifying agent in sufficient quantity to form a substantially solid deodorizing block.

4. A deodorizing composition which comprises a mixture of the chlorination products of benzol with the exception of substantial amounts of mono-chlor-benzol and the para-dichlor-benzol and in which the ortho-dichlor-benzol predominates and naphthaline in sufficient quantity to form a substantially solid deodorizing block.

In testimony whereof I affix my signature.

OTTO F. REINHOLD.